United States Patent
Tennyson

(10) Patent No.: US 7,570,599 B2
(45) Date of Patent: Aug. 4, 2009

(54) ADAPTIVELY APPLYING A TARGET NOISE MARGIN TO A DIGITAL SUBSCRIBER LINE (DSL) LOOP FOR DSL DATA RATE ESTABLISHMENT

(75) Inventor: Gary Tennyson, Pelham, AL (US)

(73) Assignee: AT&T Intellectual Property I, LLP., Reno, NV (US)

( * ) Notice: Subject to any disclaimer, the term of this patent is extended or adjusted under 35 U.S.C. 154(b) by 955 days.

(21) Appl. No.: 11/104,768

(22) Filed: Apr. 13, 2005

(65) Prior Publication Data

US 2005/0237940 A1 Oct. 27, 2005

Related U.S. Application Data

(60) Provisional application No. 60/564,169, filed on Apr. 21, 2004.

(51) Int. Cl.
  G06F 11/00 (2006.01)
  H04B 1/38 (2006.01)
  H04J 3/16 (2006.01)
  H04L 12/66 (2006.01)
  H04L 23/00 (2006.01)

(52) U.S. Cl. .................... 370/252; 370/463; 370/465; 375/219; 375/377

(58) Field of Classification Search ............... 370/252, 370/463, 465; 375/219, 377
See application file for complete search history.

(56) References Cited

U.S. PATENT DOCUMENTS 5,751,338 A    5/1998  Ludwig, Jr.
5,974,139 A   10/1999  McNamara et al.
5,987,061 A   11/1999  Chen
6,044,107 A    3/2000  Gatherer et al.
6,055,268 A    4/2000  Timm et al.
6,081,291 A    6/2000  Ludwig, Jr.
6,130,882 A   10/2000  Levin
6,219,378 B1   4/2001  Wu
6,263,048 B1   7/2001  Nelson et al.
6,292,559 B1   9/2001  Gaikwad et al.
6,317,495 B1  11/2001  Gaikwad et al.

(Continued)

OTHER PUBLICATIONS

International Telecommunication Union (ITU), "Asymmetric Digital Subscriber Line Transceivers 2 (ADSL2)," ITU-T Recommendation G.992.3, Jul. 2002 (312 pages).

(Continued)

*Primary Examiner*—Chi H Pham
*Assistant Examiner*—Farah Faroul
(74) *Attorney, Agent, or Firm*—Hanley, Flight, & Zimmerman, LLC

(57) ABSTRACT

Methods, systems, and computer program products adaptively apply a target noise margin to a DSL loop to establish a DSL data rate on the DSL loop. A method involves receiving performance data associated with a quantity of errors detected over a period of time on the DSL loop and adjusting the target noise margin for the DSL loop based on the performance data. The target noise margin is inversely associated with the DSL data rate that can be established and is adjusted in order to maximize the DSL data rate while minimizing the quantity of errors detected over the period of time. Thus, embodiments of the present invention allow a maximum data rate that can be sustained on a DSL loop without an excessive quantity of errors.

12 Claims, 5 Drawing Sheets

U.S. PATENT DOCUMENTS

| | | |
|---|---|---|
| 6,424,657 B1 | 7/2002 | Voit et al. |
| 6,445,773 B1 | 9/2002 | Liang et al. |
| 6,466,088 B1 | 10/2002 | Rezvani et al. |
| 6,467,092 B1 | 10/2002 | Geile et al. |
| 6,477,238 B1 | 11/2002 | Schneider et al. |
| 6,498,791 B2 | 12/2002 | Pickett et al. |
| 6,498,808 B1 | 12/2002 | Tzannes |
| 6,507,606 B2 | 1/2003 | Shenoi et al. |
| 6,532,277 B2 | 3/2003 | Ulanskas et al. |
| 6,538,451 B1 | 3/2003 | Galli et al. |
| 6,549,568 B1 | 4/2003 | Bingel |
| 6,570,855 B1 | 5/2003 | Kung et al. |
| 6,597,689 B1 | 7/2003 | Chiu et al. |
| 6,608,835 B2 | 8/2003 | Geile et al. |
| 6,614,781 B1 | 9/2003 | Elliott et al. |
| 6,625,255 B1 | 9/2003 | Green et al. |
| 6,636,505 B1 | 10/2003 | Wang et al. |
| 6,640,239 B1 | 10/2003 | Gidwani |
| 6,643,266 B1 | 11/2003 | Pugaczewski |
| 6,647,058 B1 | 11/2003 | Bremer et al. |
| 6,658,052 B2 | 12/2003 | Krinsky et al. |
| 6,667,971 B1 | 12/2003 | Modarressi et al. |
| 6,668,041 B2 | 12/2003 | Kamali et al. |
| 6,674,725 B2 | 1/2004 | Nabkel et al. |
| 6,674,749 B1 | 1/2004 | Mattathil |
| 6,678,245 B1 | 1/2004 | Cooper et al. |
| 6,680,940 B1 | 1/2004 | Lewin et al. |
| 6,697,768 B2 | 2/2004 | Jones et al. |
| 6,700,927 B1 | 3/2004 | Esliger et al. |
| 6,724,859 B1 | 4/2004 | Galli |
| 6,728,238 B1 | 4/2004 | Long et al. |
| 6,731,678 B1 | 5/2004 | White et al. |
| 6,735,601 B1 | 5/2004 | Subrahmanyam |
| 6,751,218 B1 | 6/2004 | Hagirahim et al. |
| 6,751,315 B1 | 6/2004 | Liu et al. |
| 6,751,662 B1 | 6/2004 | Natarajan et al. |
| 6,754,283 B1 | 6/2004 | Li |
| 6,762,992 B1 | 7/2004 | Lemieux |
| 6,763,025 B2 | 7/2004 | Leatherbury et al. |
| 6,765,864 B1 | 7/2004 | Natarajan et al. |
| 6,765,918 B1 | 7/2004 | Dixon et al. |
| 6,769,000 B1 | 7/2004 | Akhtar et al. |
| 6,769,024 B1 | 7/2004 | Natarajan et al. |
| 6,771,673 B1 | 8/2004 | Baum et al. |
| 6,775,232 B1 | 8/2004 | Lemieux |
| 6,775,267 B1 | 8/2004 | Kung et al. |
| 6,775,268 B1 | 8/2004 | Wang et al. |
| 6,775,273 B1 | 8/2004 | Kung et al. |
| 6,778,525 B1 | 8/2004 | Baum et al. |
| 6,782,078 B1 | 8/2004 | Posthuma |
| 6,782,082 B2 | 8/2004 | Rahamim |
| 6,819,746 B1 | 11/2004 | Schneider et al. |
| 6,914,961 B2 | 7/2005 | Holeva |
| 6,985,444 B1 | 1/2006 | Rosen |
| 7,027,405 B1 * | 4/2006 | Khadavi ..................... 370/244 |
| 7,106,833 B2 | 9/2006 | Kerpez |
| 7,162,011 B2 | 1/2007 | Kolligs et al. |
| 7,218,645 B2 | 5/2007 | Lotter et al. |
| 7,272,209 B2 | 9/2007 | Jiang et al. |
| 7,295,570 B1 | 11/2007 | Arnold et al. |
| 2002/0021708 A1 | 2/2002 | Ishiai |
| 2002/0057763 A1 | 5/2002 | Sisk et al. |
| 2002/0080886 A1 | 6/2002 | Ptasinski et al. |
| 2002/0118733 A1 * | 8/2002 | Frenkel ..................... 375/219 |
| 2002/0168054 A1 | 11/2002 | Klos et al. |
| 2003/0007455 A1 | 1/2003 | Kohzuki et al. |
| 2003/0033262 A1 | 2/2003 | Aoki |
| 2003/0095591 A1 | 5/2003 | Rekai et al. |
| 2003/0189977 A1 | 10/2003 | Sweitzer et al. |
| 2003/0218984 A1 | 11/2003 | Tanaka |
| 2004/0095921 A1 | 5/2004 | Kerpez |
| 2004/0136329 A1 | 7/2004 | Duvaut et al. |
| 2004/0141519 A1 * | 7/2004 | Greenfield et al. .......... 370/463 |
| 2005/0068891 A1 | 3/2005 | Arsikere et al. |
| 2005/0141673 A1 | 6/2005 | Lunt et al. |
| 2005/0163286 A1 * | 7/2005 | Jiang et al. ................ 379/1.04 |
| 2005/0172030 A1 | 8/2005 | Fay |
| 2005/0175117 A1 * | 8/2005 | Wu et al. ..................... 375/286 |
| 2006/0268733 A1 * | 11/2006 | Rhee et al. ................. 370/252 |
| 2008/0219290 A1 * | 9/2008 | Cioffi et al. ................ 370/465 |

OTHER PUBLICATIONS

United States Patent and Trademark Office, "A Non-Final Office Action," issued in connection with U.S. Appl. No. 10/761,123, on Feb. 9, 2007 (6 pages).

United States Patent and Trademark Office, "A Notice of Allowability," issued in connection with U.S. Appl. No. 10/761,123, on Jul. 12, 2007 (4 pages).

United States Patent and Trademark Office, "A Non-Final Office Action," issued in connection with U.S. Appl. No. 10/764,816, on Jul. 16, 2007 (17 pages).

United States Patent and Trademark Office, "A Final Office Action," issued in connection with U.S. Appl. No. 10/764,816, on Dec. 2, 2007 (23 pages).

United States Patent and Trademark Office, "A Non-Final Office Action," issued in connection with U.S. Appl. No. 10/764,816, on Mar. 17, 2008 (21 pages).

United States Patent and Trademark Office, "A Non-Final Office Action," issued in connection with U.S. Appl. No. 10/764,816, on Sep. 19, 2008 (22 pages).

United States Patent and Trademark Office, "A Final Office Action," issued in connection with U.S. Appl. No. 10/764,816, on Mar. 3, 2009 (22 pages).

* cited by examiner

ADAPTIVELY APPLYING A TARGET NOISE MARGIN TO A DIGITAL SUBSCRIBER LINE (DSL) LOOP FOR DSL DATA RATE ESTABLISHMENT

CROSS-REFERENCE TO RELATED APPLICATION

This application claims priority to U.S. provisional application entitled, "Automated, Adaptive Target Noise Margin for DSL Sync Rate Establishment," having Ser. No. 60/564,169, filed Apr. 21, 2004, which is entirely incorporated herein by reference.

TECHNICAL FIELD

The present invention generally relates to maximizing digital subscriber line (DSL) data rates and, more particularly, relates to methods, computer program products, and systems for adaptively applying a target noise margin to a DSL loop in order to establish a DSL data rate on the DSL loop.

BACKGROUND

The information age has facilitated an increase in the consumer need for speed when it comes to delivering data to end-users on a DSL loop or transmission line. However, changes in the maximum DSL data rate downstream has caused some end-users to experience increased trouble or errors when their DSL data rate or sync rate is increased, for example, from 1.5 millions of bits per second (Mbps) to 3 Mbps. Research indicates that the bulk of these errors are due to transient, impulse, or non-stationary noise.

Manually handling this increase in troubled lines on a case-by-case basis does not appear to be feasible. Furthermore, a single profile that both allows the maximum data rate on the 'non-troubled' lines, and deals effectively with the 'trouble' lines has not been developed. Given the amount of variation in noise seen on some of these lines, a profile that could prevent the majority of the problems would have the effect of significantly decreasing the maximum data rate on the shortest loops. It would also have the effect of shutting down many lines that are working fine.

In many cases, DSL technology, such as asymmetric digital subscriber line (ADSL) technology, is employed today without forward error correction. This is probably a preferred way to deploy ADSL for Internet access, but as a consequence of deploying ADSL without forward error correction, the DSL loop is more subject to impulse noise. Further, at higher data rates, impulse noises are particularly acute because these higher data rates require a higher level of signal to noise ratio (SNR) which is another way of saying the DSL loops are more sensitive to lower levels of impulse noise. All transmission systems require some minimum value of SNR in order to limit a Bit Error Ratio (BER) to some acceptable level.

Impulse noise may be generated when some appliances, such as exercise machines, fluorescent lamps, and mixers, are used. When these devices are started, they can generate impulse noise with sufficient amplitude to cause an ADSL line to take errors. If enough errors are taken, the ADSL line will simply reset. Resetting is not particularly bad except that the customer may be out of service for several seconds or even minutes while the DSL line is resetting.

The problem is that many times the noise is so sporadic that it will be on long enough to cause the DSL line to reset, but then subsides while the DSL loop is reinitializing. As a result, the DSL line is reset to its original data rate. This cycle repeats itself until the noise is present during initialization. For extremely bursty noise cases, the cycle may never end.

One way to counter the problem of impulse noise is to turn on forward error correction. However, this approach is only effective when coupled with interleaving. The use of interleaving introduces delay that is problematic for Internet access. Another approach of previous systems is to slowly ramp up the data rate over a period of time, for example a month. Between each step in ramping up the data rate, there is a waiting period of several days to examine customer error rates and make the determination as to whether the error rate is such that the ramping up should cease or whether to return to a previous setting. However, this approach takes a relatively long time.

Accordingly there is an unaddressed need in the industry to address the aforementioned deficiencies and inadequacies.

SUMMARY OF THE INVENTION

Embodiments of the present invention provide methods, computer program products, and systems for adaptively applying a target noise margin to a DSL loop to establish a DSL data rate on the DSL loop. An automated, adaptive, approach to applying the target noise margin is disclosed. In such an approach, embodiments of the present invention increase the target noise margin for the DSL loop or line on those lines experiencing trouble until the line runs error-free from the influence from impulse noise. Thus, embodiments of the present invention allow a maximum DSL data rate that can be sustained without an excessive quantity of errors over a period of time.

One embodiment is a computer-implemented method for adaptively applying a target noise margin to a DSL loop to establish a DSL data rate on the DSL loop. The method involves receiving performance data associated with the quantity of errors detected over a period of time on the DSL loop and adjusting the target noise margin for the DSL loop based on the performance data. The target noise margin is adjusted in order to increase the DSL data rate and reduce the quantity of errors detected over the period of time. It should be appreciated that the target noise margin is inversely related to the DSL data rate that can be established.

Another embodiment is a computer program product including a computer-readable medium having control logic stored therein for causing a computer to adaptively apply a target noise margin to a DSL loop to establish a DSL data rate on the DSL loop. The control logic includes computer-readable program code for causing the computer to receive performance data associated with a quantity of errors detected over a period of time on the DSL loop and adjust the target noise margin for the DSL loop based on the performance data. The target noise margin is inversely related to the DSL data rate and is adjusted in order to maximize or increase the DSL data rate and minimize or reduce the quantity of errors detected over the period of time.

Still another embodiment is a computing system for adaptively applying a target noise margin to a DSL loop experiencing errors due to impulse noise in order to establish a DSL data rate on the DSL loop. The computing system includes a processor operative to receive performance data associated with a quantity of errors detected over a period of time on the DSL loop and adjust the target noise margin for the DSL loop based on the performance data. The target noise margin is adjusted in order to increase the DSL data rate and reduce the quantity of errors detected over the period of time.

Other systems, methods, apparatuses, features, and advantages of the present invention will be or become apparent to one with skill in the art upon examination of the following drawings and detailed description. It is intended that all such additional systems, methods, features, apparatuses, and

DETAILED DESCRIPTION

As described briefly above, embodiments of the present invention provide methods, systems, and computer program products for adaptively applying a target noise margin to a DSL loop in order to establish a DSL data rate on the DSL loop. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
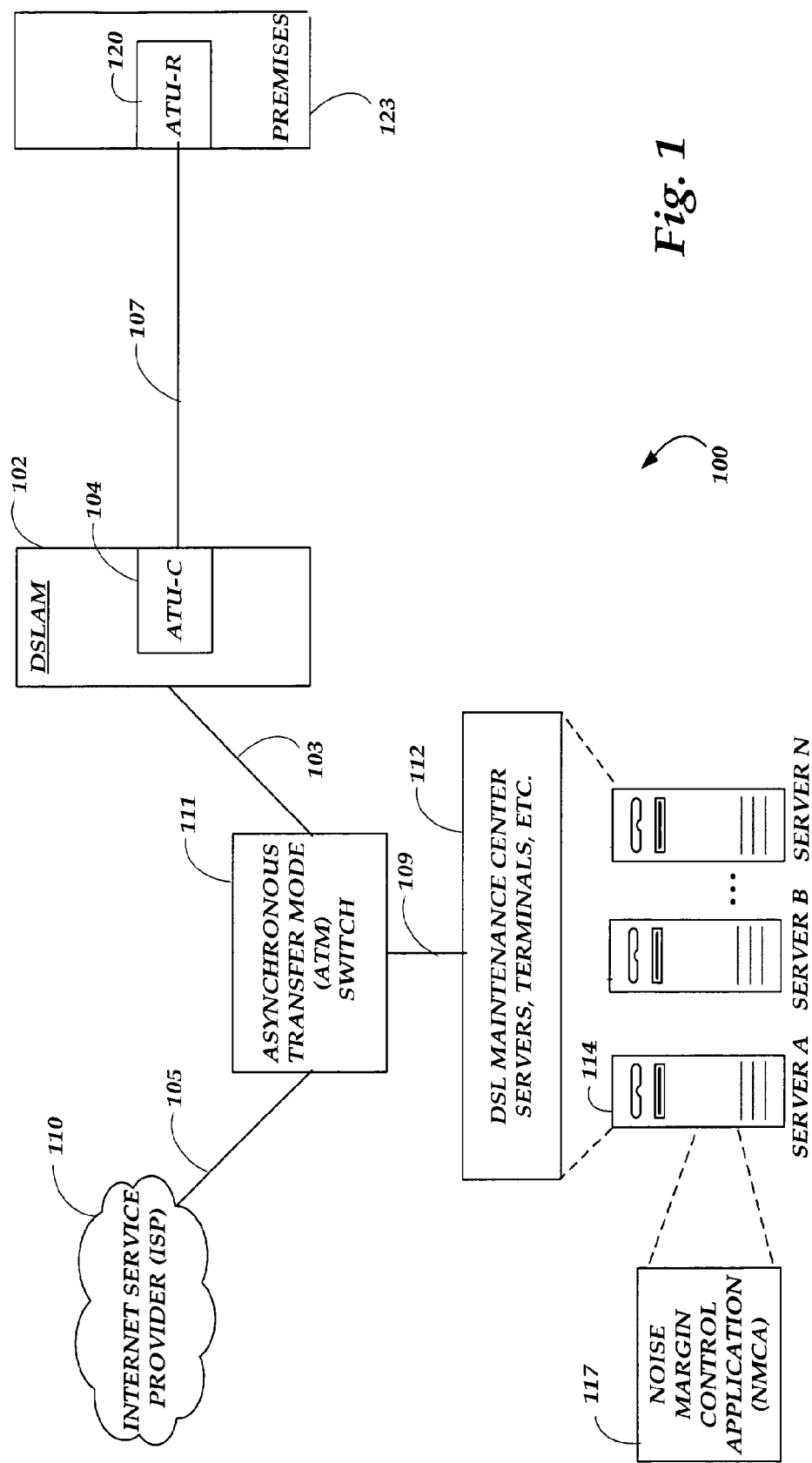
FIG. 1 is a functional network diagram illustrating aspects of a communications network utilized in an illustrative embodiment of the invention.
Figure 2:
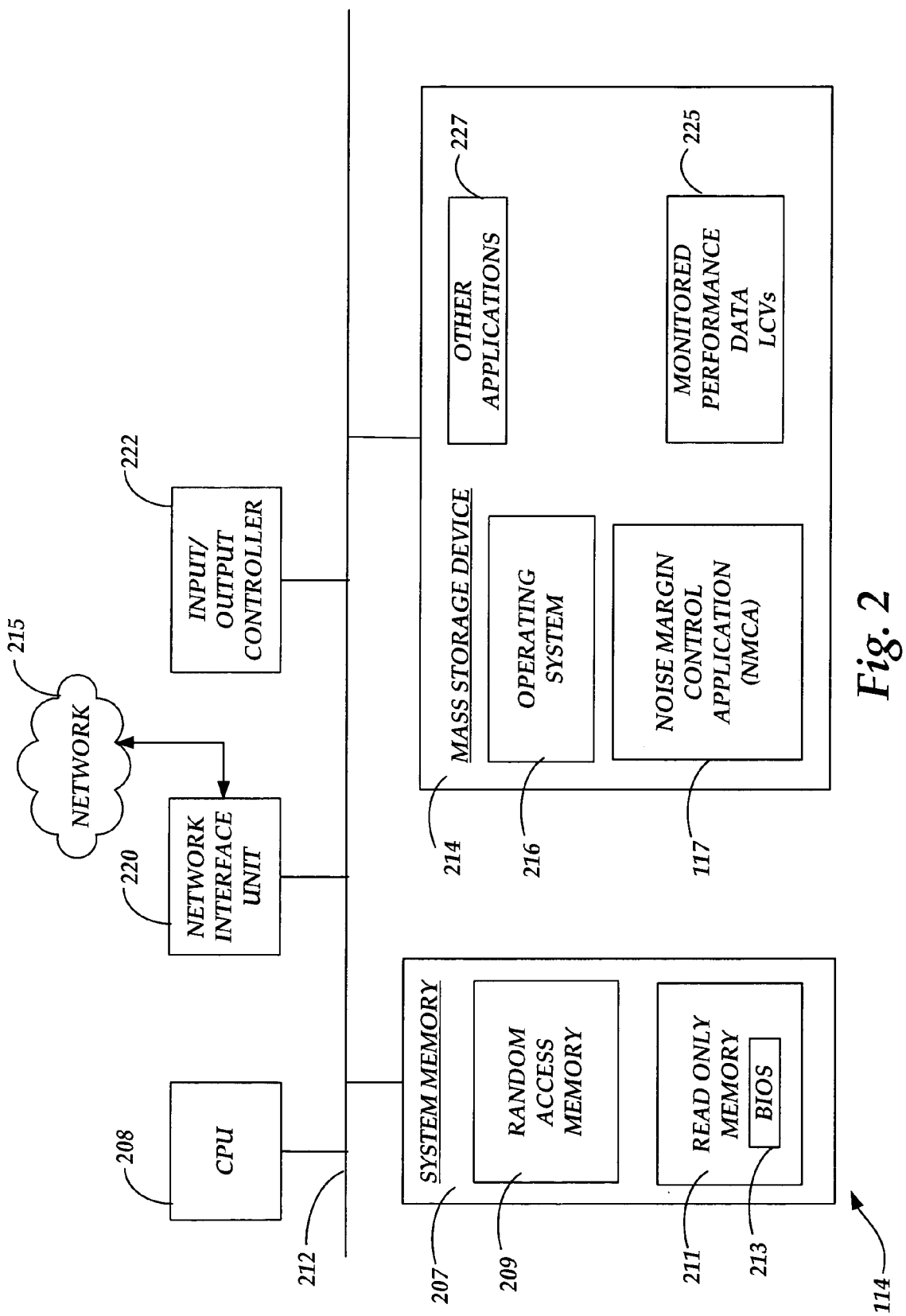
FIG. 2 illustrates computing system architecture for a server computing apparatus utilized in an illustrative embodiment of the invention.
Figure 3:
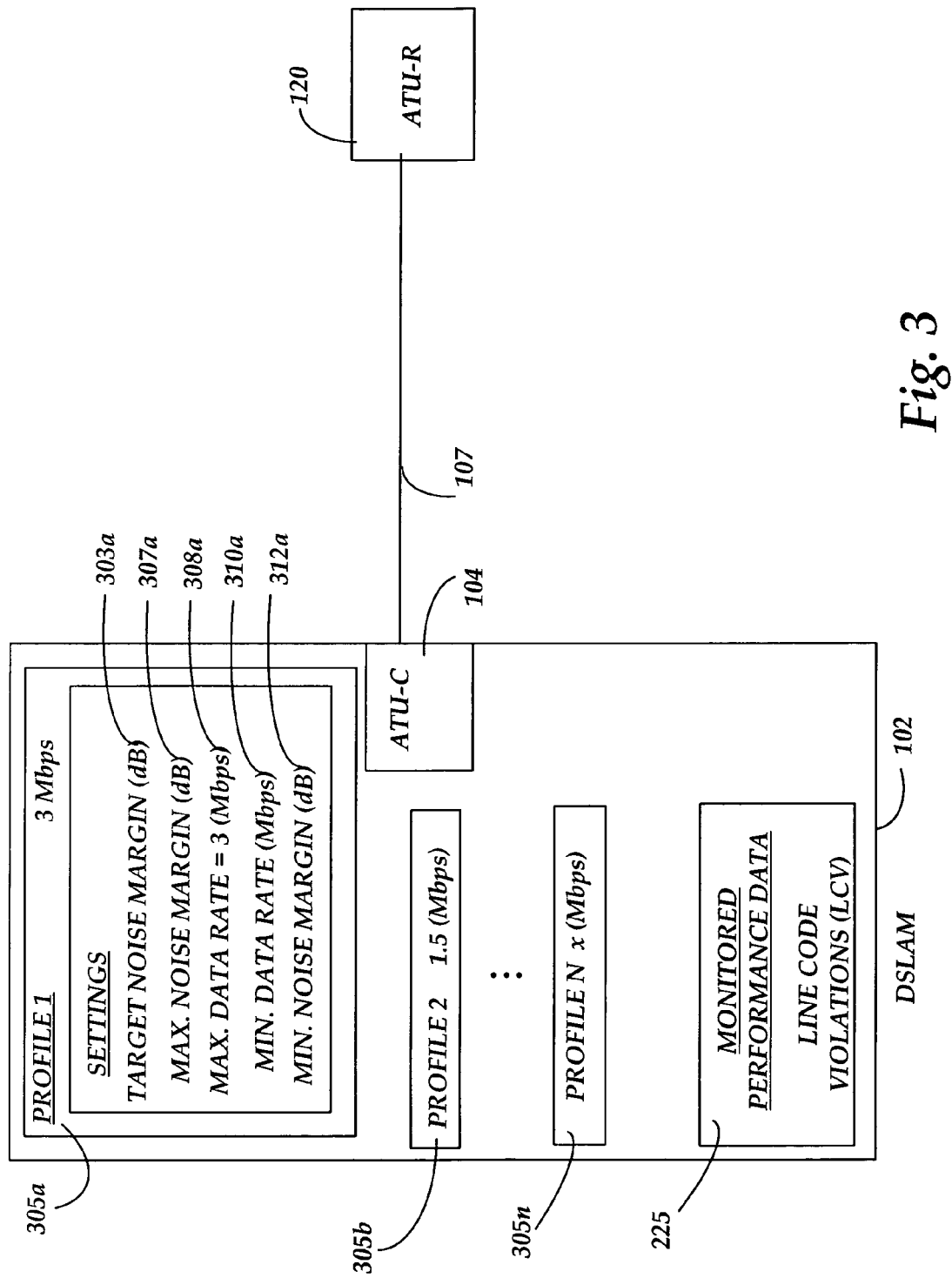
FIG. 3 illustrates a digital subscriber line access multiplexer (DSLAM) containing profiles that include settings associated with a DSL loop and utilized in an illustrative embodiment of the invention.

Referring now to the drawings, in which like numerals represent like elements through the several figures, aspects of the present invention and the illustrative operating environment will be described. FIGS. 1-3 and the following discussion are intended to provide a brief, general description of a suitable computing environment in which the embodiments of the invention may be implemented. While the invention will be described in the general context of program modules that execute on a communications apparatus, those skilled in the art will recognize that the invention may also be implemented in combination with other program modules.

Generally, program modules include routines, operations, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

It is advantageous to describe an illustrative operating environment in which the present invention may operate. FIG. 1 is a functional network diagram illustrating aspects of a communications network that provide an illustrative operating environment for embodiments of the invention. The operating environment illustrates a DSL communications network 100 (DCN). Components of the DCN 100 include a DSLAM 102 having line cards that have multiple ports per card. Each of these ports connects to a wire pair, such as the wire pair or loop 107 which leads to a subscriber's premises 123. At the subscriber's premises 123, there is an end-user modem, such as an ADSL Transceiver Unit-Remote (ATU-R) 120, connected to the wire pair 107. The ATU-R 120 has a matching unit at the carrier's central office (CO) in the form of an ATU-C 104. The two units 104 and 120 together support a high DSL data rate over the DSL loop 107. Built in to the DNC 100 is a performance monitoring mechanism where the ATU-R 120 in real time updates the ATU-C 104 with performance indicators. One of those performance indicators is line code violations (LCVs) or errors. The standard requirement is that the ATU-C 104 maintain these performance indicators in 15 minute intervals for up to eight hours.

Between the DSLAM 102 and an asynchronous transfer mode (ATM) switch 111 is a high-speed digital line 103. From the ATM switch 111 there is an optical transport 105 to an Internet Service Provider (ISP) 110 as well as a transport 109 over to a DSL maintenance center 112. One or more servers or computing apparatuses, one of which is designated at reference numeral 114, reside at the DSL maintenance center 112 where a number of terminals, different systems, and different processors execute important operations. The servers 114 may each include a noise margin control application (NMCA) 117 operative to adaptively apply a target noise margin to DSL loops, for instance the DSL loop 107, experiencing errors due to impulse noise.

In an illustrative embodiment of the present invention the DSL data rate is initialized, both upstream and downstream, on the DSL loop 107, such as an ADSL line, at a maximum data rate achievable without regard for errors. After a period of time, the server 114 queries the DSLAM 102 (or equivalent network device) serving the DSL loop 107 and obtains an error performance of the DSL loop 107. If the error rate is found to be excessive, beyond a predetermined threshold, the server 114 assigns the DSL loop 107 a different target noise margin via a profile. For example, the server 114 may assign a value of target noise margin of 8 or 9 dB instead of 6 dB. If the error rate does not exceed the predetermined threshold, no changes to the DSL loop 107 are made, but the server 114 still obtains performance data periodically.

After assigning the profile with the higher value of target noise margin, the DSL loop 107 will likely re-initialize to a lower data rate. Again, the server 114 would obtain the error performance after a period of time. If the error performance is again found to be unacceptable, the line would be assigned a profile with an even higher value of target noise margin of, for example, 10-12 dB. In this way, the maximum data rate that can be supported, without excessive errors, is found. Additional details regarding the server computers 114 will be described below with respect to FIGS. 2-5.

FIG. 2 illustrates a computing apparatus architecture for the server 114 of FIG. 1 utilized in an illustrative embodiment of the invention. The server 114 includes a central processing unit (CPU) 208, a system memory 207, and a system bus 212 that couples the system memory 207 to the CPU 208. The system memory 207 includes read-only memory (ROM) 211 and random access memory (RAM) 209. A basic input/output system (BIOS) 213, containing the basic routines that help to transfer information between elements within the server 114, such as during start-up, is stored in ROM 211. The server 114 further includes a mass storage device (MSD) 214 for storing an operating system 216 such as LINUX, the NMCA 117 for adaptively applying a target noise margin DSL loops experiencing errors due to impulse noise, and monitored performance data 225 received from the DSLAM 102. The MSD 214 may also include other applications 227, such as a web browser for accessing the Internet. Additional details regarding adaptively applying a target noise margin to DSL loops experiencing errors due to impulse noise will be described below with respect to FIGS. 3-5.

The MSD 214 is connected to the CPU 208 through a mass storage controller (not shown) connected to the system bus 212. The MSD 214 and its associated computer-readable media, provide non-volatile storage for the server 114. Although the description of computer-readable media contained herein refers to a MSD, such as a hard disk, it should be appreciated by those skilled in the art that computer-readable media can be any available media that can be accessed by the CPU 208. An input/output controller 222 may also be included with the server 114 for receiving and processing input from a number of input devices (not shown). The input/output controller 222 communicates with the CPU 208 through the system bus 212.

The CPU 208 may employ various operations, discussed in more detail below with reference to FIGS. 4 and 5 to provide and utilize the signals propagated between the server 114 and the DSLAM 102. The CPU 208 may store data to and access data from the MSD 214, such as electronic memory or magnetic storage. Data is transferred to and received from the MSD 214 through the system bus 212. The CPU 208 may be a general-purpose computer processor. Furthermore as mentioned below, the CPU 208, in addition to being a general-purpose programmable processor, may be firmware, hard-wired logic, analog circuitry, other special purpose circuitry, or any combination thereof.

According to various embodiments of the invention, the server 114 operates in a networked environment, as shown in FIG. 1, using logical connections to remote computing devices via network communication. The server 114 may connect to a network 215 via a network interface unit 220. It should be appreciated that the network interface unit 220 may also be utilized to connect to other types of networks and remote computer systems.

A computing apparatus, such as the server 114, typically includes at least some form of computer-readable media. Computer readable media can be any available media that can be accessed by the server 114. By way of example, and not limitation, computer-readable media may include computer storage media.

Computer storage media includes volatile and nonvolatile, removable and non-removable media implemented in any method or technology for storage of information such as computer readable instructions, program modules or other data. Computer storage media includes, but is not limited to, RAM, disk drives, a collection of disk drives, flash memory, other memory technology or any other medium that can be used to store the desired information and that can be accessed by the server 114.

Combinations of any of the above should also be included within the scope of computer-readable media. Computer-readable media may also be referred to as computer program product.

FIG. 3 illustrates the DSLAM 102 containing profiles 305a-305n where each profile includes settings that may be applied to the DSL loop 107 in an illustrative embodiment of the invention. The DSLAM 102 also receives performance data or indicators 225 from the ATU-R 120 via the ATU-C 104. The settings per profile that may be adaptively applied to the DSL loop 107 based on the performance data 225 include a target noise margin 303a in decibels (dB), a maximum noise margin 307a in dB, a maximum DSL data rate 308a in Mbps, and a minimum DSL data rate 310a in Mbps. A parameter denoted minimum noise margin 312a in dB is also assigned via the profile 305a. This is the value of noise margin, below which the DSL loop re-initializes. Margin is a value that represents the difference in dB between what is required to operate a DSL loop at 10-7 BER and the amount of available SNR.

During initialization, the settings for the applied profile are sent to the ATU-R 120. The target noise margin 303a is the minimum noise margin that will be achieved on the DSL loop 107 when the profile 1 305a is applied. As this value is increased, the number of bits assigned to a tone (with some specific available SNR) decreases. It can be seen, then, that the achievable data rate is inversely related to the target noise margin.

The maximum noise margin 307a is the value of the noise margin above which the ATU-C 104 or the ATU-R 120 will instruct the far-end transmitter to decrease the transmitted power. In this illustrative embodiment, the maximum data rate 308a set for the profile 1 305a is 3 Mbps. When the profile 1 305a is applied to the DSL loop 107, and the DSL loop 107 is initialized at 3 Mbps with the target noise margin 303a set at, for example, 6 dB, the DSL loop 107 may experience some errors due to impulse noise.

The noise margin for the DSL loop 107 may be significantly degraded to the point that errors are experienced by the impulse noise. The noise margin may be increased by applying a different profile with a higher target noise margin to the DSL loop 107. When a DSL line, such as the DSL loop 107, is provisioned for a higher data rate, the DSL maintenance center 112, via the server 114, queries the DSLAM 102 for performance data.

If, during these queries, the error rate is found to be excessive, the NMCA applies a profile, for example the profile 2 305b or the profile n 305n, with a higher value of target noise margin than the target noise margin 303a to the DSL loop 107. Thus, for instance, at a minimum frequency, the server 114 may query the DSLAM 102 once every eight hours for performance data. The server 114 could also query the DSLAM 102 every 15 minutes, but at a minimum, every eight hours to determine whether the particular DSL line is exhibiting an excessive amount of errors (for example, 500 LCVs in 15 minutes). Additional details regarding adaptively applying a target noise margin will be described below with respect to FIGS. 4 and 5.

Figure 4:
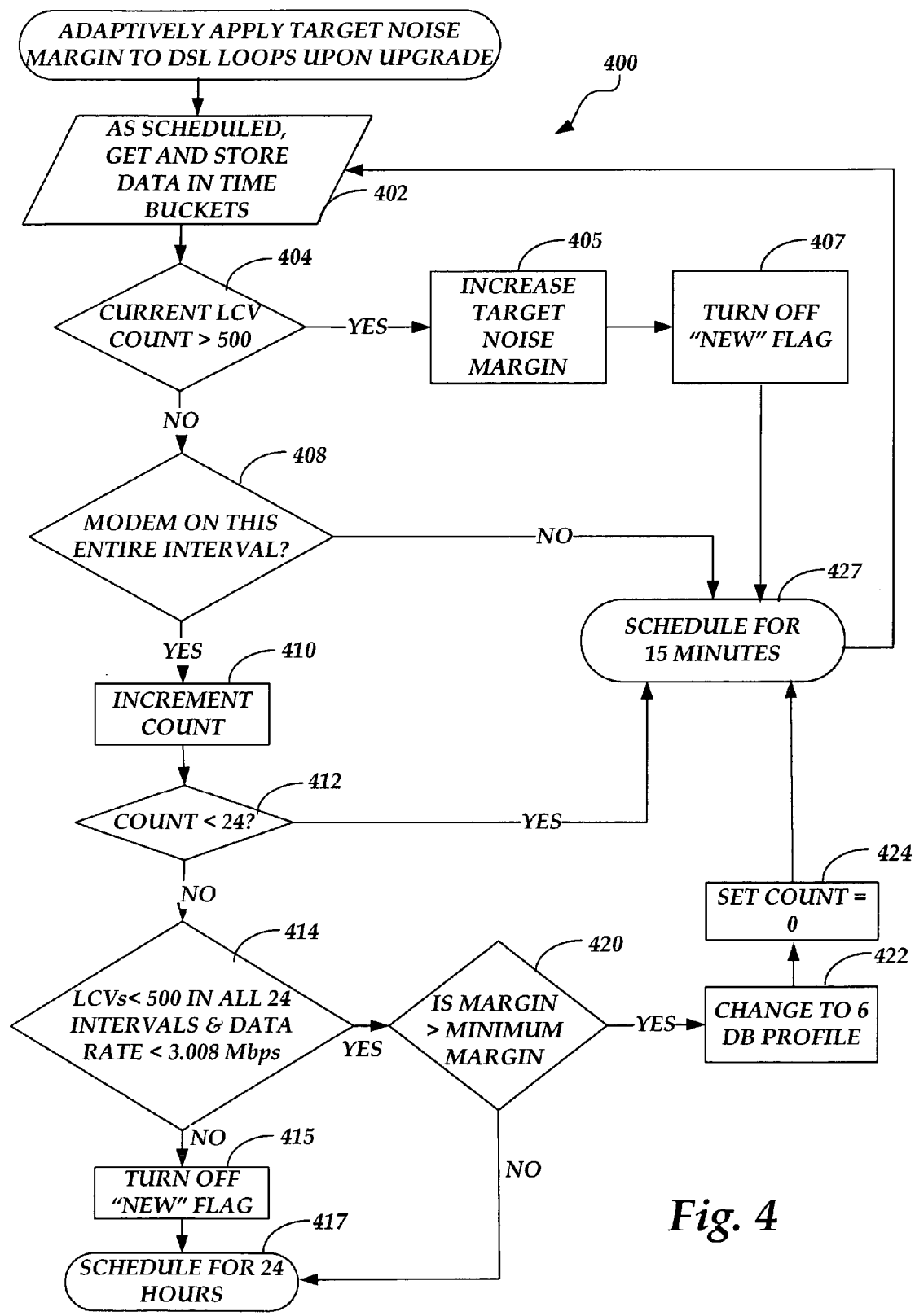
FIG. 4 illustrates an operational flow performed in adaptively applying a target noise margin to a newly upgraded DSL loop scheduled for performance monitoring at a predetermined frequency in order to establish a DSL data rate on the DSL loop according to an illustrative embodiment of the invention.
Figure 5:
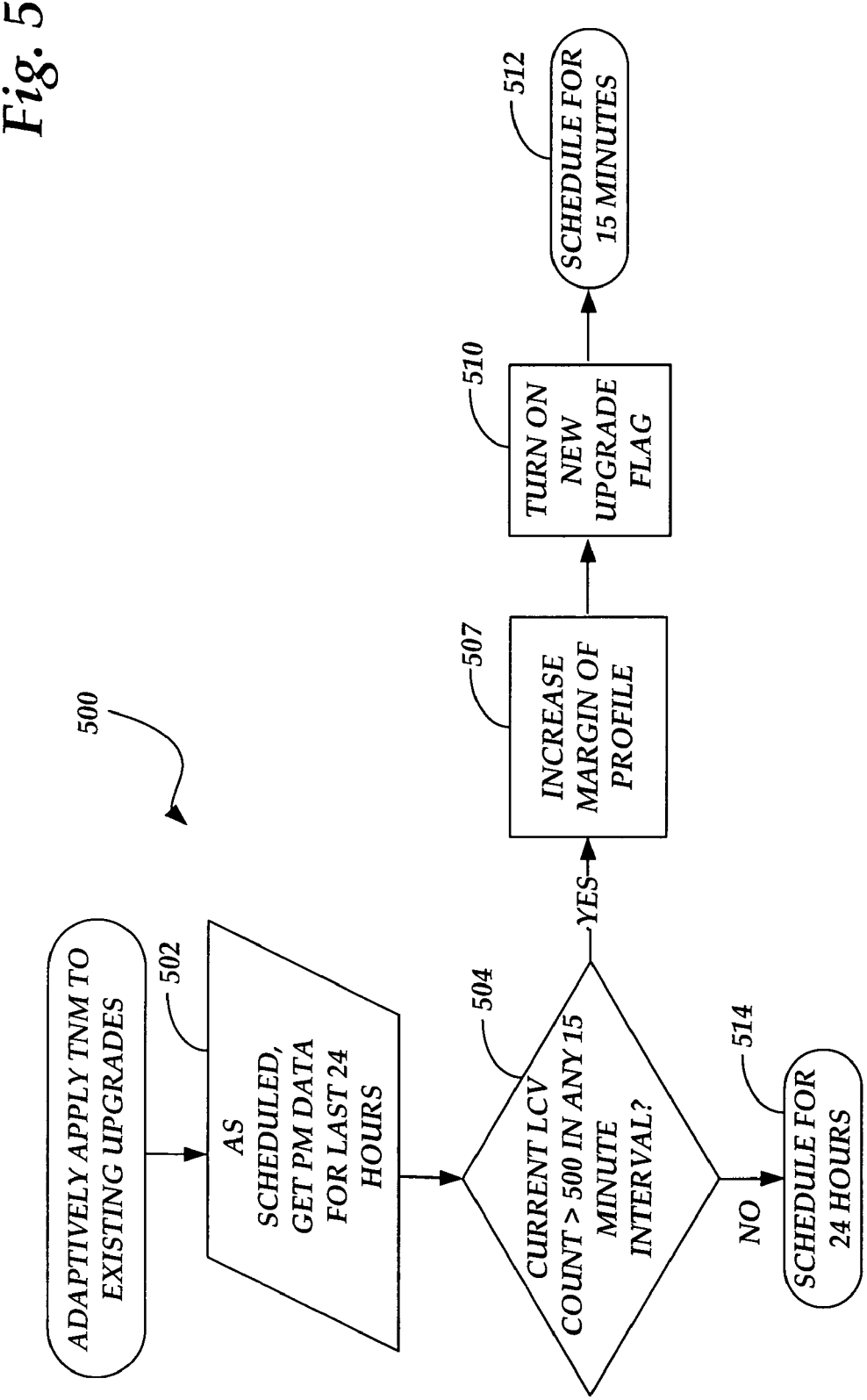
FIG. 5 illustrates an operational flow performed in adaptively applying a target noise margin to an established DSL loop scheduled for performance monitoring at a frequency less than the predetermined frequency of FIG. 4 according to another illustrative embodiment of the invention.

FIGS. 4 and 5 are illustrative routines or operational flows performed in adaptively applying a target noise margin to a DSL loop to establish a DSL data rate on the DSL loop according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4 and 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Turning now to FIGS. 1, 2, 3, and 4 an operational flow 400 performed in adaptively applying a target noise margin to a newly upgraded DSL loop scheduled for performance monitoring at a predetermined frequency according to an illustrative embodiment of the invention will be described. The operational flow 400 begins at operation 402 where the server 114 retrieves performance data associated with the DSL loop 107 from the DSLAM 102. The performance data may be periodically retrieved on a schedule in time buckets. For example, the performance data may be retrieved every 15 minutes, which is the standard period of time for updates on DSL loop performance to be received by the ATU-C 104.

The operational flow 400 then continues to operation 404 where the server 114 determines whether the quantity of LCVs exceeds a predetermined threshold value of, for instance, 500, over a designated period of time. If the server 114 detects that the LCVs do exceed the predetermined threshold over a 15 minute time bucket, the routine 400 continues to operation 405.

At operation 405, the server 114 increases the target noise margin for the DSL loop 107. This may be accomplished by changing the profile applied to the DSL loop 107, for example from the profile 1 305a at 6 dB to the profile 2 305b at 9 dB target noise margin. The operational flow 400 then continues from operation 405 to operation 407 where the server 114 turns off a flag set when the DSL loop 107 was upgraded that identifies the DSL loop 107 as a newly upgraded DSL loop. The server 114 then schedules the DSL loop 107 for performance monitoring and error assessment for the next designated period of time at operation 427.

If at operation 404, the server 114 detects that the LCVs are less than the predetermined threshold, the operational flow 400 continues from operation 404 to operation 408. At operation 408, a determination is made as to whether a modem at the premises 123, for instance the ATU-R 120, has been on for the entire interval of time covering the period of time. When the modem 120 has not been on for the entire time interval, the operational flow returns to operation 427 described above. When the modem 120 has been on the entire period of time, the operational flow 400 continues from operation 408 to operation 410 where the server 114 increments by one a count that keeps track of how many times the DSL loop 107 has been examined or monitored successfully for an LCV count below the predetermined quantity.

Next, at operation 412 the server 114 determines whether the incremented count is less than a predetermined number of, for example, 24 . If at operation 412, the incremented count is less than the predetermined number, the operational flow 400 returns to operation 427 described above. When the incremented count is at or above the predetermined number, the operational flow 400 continues to operation 414.

At operation 414, the server 114 determines whether both the LCVs have been less than the predetermined threshold quantity each time the count has been incremented and the DSL data rate is less than a predetermined value. When either the LCVs were not less than the threshold each time the count was incremented or the DSL data rate is not less than the predetermined value, the operational flow 400 continues to operation 415 where the server 114 turns off a flag indicating that the DSL loop 107 has been newly upgraded. The server 114 then schedules the DSL loop 107 for performance monitoring and error assessment at an interval of time greater than the predetermined period of time thereby scheduling examination on a less frequent basis, for example every 24 hours instead of 15 minutes.

When at operation 414, the server 114 determines that both the LCVs were less than the threshold each time the count was incremented and the DSL data rate is less than the predetermined value, the operational flow 400 continues to operation 420 where the server 114 determines whether the current target margin is greater than a minimum target margin, for example 6 dB. When the current target margin is not greater than the minimum target margin available among the profiles, the operational flow 400 continues from operation 420 to operation 417 described above.

When at operation 420, the server 114 detects that the current target margin is greater than the minimum target margin available, the operational flow 400 continues from operation 420 to operation 422. At operation 422, the server 114 changes the target margin to the minimum target noise margin, for example to 6 dB. This may be accomplished by changing the profile applied to the DSL loop 107. This change is made in an effort to increase the data rate in view of minimal errors at a higher target noise margin and at a lower DSL data rate.

Next at operation 424, the server 114 sets the count to zero, to give the newly adjusted DSL loop 107 a fresh start at error assessment. The operational flow then continues to operation 427 described above.

Turning now to FIGS. 1, 2, 3, and 5 an operational flow 500 performed in adaptively applying a target noise margin to an established DSL loop scheduled for performance monitoring at a frequency less than the predetermined frequency of FIG. 4 according to an illustrative embodiment of the invention will be described. Established DSL loops have already been upgraded and/or been in operation with performance monitoring. The operational flow 500 begins at operation 502 where server 114 retrieves performance data associated with the DSL loop 107 from the DSLAM 102. The performance data may be periodically retrieved on a schedule in time buckets. For example, the performance data may be retrieved every 24 hours in 15-minute time buckets.

The operational flow 500 then continues to operation 504 where the server 114 determines whether the quantity of LCVs exceed a predetermined threshold value of, for instance, 500 over a designated period of time. For example, the server 114 may determine whether the LCVs exceeded 500 in any 15-minute period during the 24 hours of data retrieved. If the server 114 detects that the LCVs do exceed the predetermined threshold over any 15-minute time bucket, the routine 500 continues to operation 507.

At operation 507, the server 114 increases the target noise margin for the DSL loop 107. This may be accomplished by changing the profile applied to the DSL loop 107, for example from the profile 1 305a at 6 dB to the profile 2 305b at 9 dB target noise margin. The operational flow 400 then continues from operation 507 to operation 510 where the server 114 turns on a flag that identifies the DSL loop 107 as a newly upgraded DSL loop. The server 114 then schedules the DSL loop 107 for performance monitoring and error assessment for the next designated period of time at operation 512.

If at operation 504, the server 114 detects that the LCVs are less than the predetermined threshold, the operational flow 500 continues from operation 504 to operation 514. At operation 514, the server 114 schedules the DSL loop 107 for performance data retrieval and error assessment at the same period greater than the designated period of time.

Thus, the present invention is presently embodied as methods, systems, computer program products or computer readable mediums encoding computer programs for adaptively applying a target noise margin to a DSL loop to establish a DSL data rate on the DSL loop.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for adaptively applying a target noise margin to a digital subscriber line (DSL) loop to establish a DSL data rate on the DSL loop, the method comprising:

receiving, by a processor, performance data associated with a quantity of errors detected over a period of time on the DSL loop;

adjusting, by the processor, the target noise margin for the DSL loop based on the performance data in order to increase the DSL data rate and to reduce the quantity of errors detected over the period of time;

wherein the target noise margin is inversely associated with an establishable DSL data rate;

thereby allowing a sustainable increased data rate while reducing the quantity of errors detected over the period of time;

detecting, by the processor, whether the DSL loop is identified as a newly upgraded loop; and in response to increasing the target noise margin for the DSL loop identified as a newly upgraded loop, removing a newly upgraded status from and scheduling the DSL loop for performance data retrieval and error assessment at an interval of time of less than or equal to the period of time.

2. The method of claim 1, wherein determining whether the quantity of errors exceed a threshold quantity for the period of time comprises determining whether a quantity of current line code violations for the DSL loop exceed the threshold quantity for the period of time.

3. A computer-implemented method for adaptively applying a target noise margin to a digital subscriber line (DSL) loop to establish a DSL data rate on the DSL loop, the method comprising:

receiving, by a processor, performance data associated with a quantity of errors detected over a period of time on the DSL loop;

adjusting, by the processor, the target noise margin for the DSL loop based on the performance data in order to increase the DSL data rate and to reduce the quantity of errors detected over the period of time;

wherein the target noise margin is inversely associated with an establishable DSL data rate;

thereby allowing a sustainable increased data rate while reducing the quantity of errors detected over the period of time;

in response to determining that the quantity of errors do not exceed the threshold quantity, determining whether an end user modem for the DSL loop has been on for the period of time; and in response to determining that the end user modem has not been on for the period of time, scheduling the DSL loop for performance data retrieval and error assessment at the interval of time of less than or equal to the period of time.

4. The method of claim 3, wherein receiving the performance data associated with the quantity of errors comprises retrieving the performance data from a digital subscriber line access multiplexer (DSLAM) associated with the DSL loop.

5. The method of claim 4, wherein adjusting the target noise margin for the DSL loop based on the performance data comprises applying a different profile to the DSL loop wherein the profile includes a different setting for the target noise margin and wherein the DSLAM includes multiple profiles for application to the DSL loop.

6. A computer-implemented method for adaptively applying a target noise margin to a digital subscriber line (DSL) loop to establish a DSL data rate on the DSL loop, the method comprising:

receiving, by a processor, performance data associated with a quantity of errors detected over a period of time on the DSL loop;

adjusting, by the processor, the target noise margin for the DSL loop based on the performance data in order to increase the DSL data rate and to reduce the quantity of errors detected over the period of time;

wherein the target noise margin is inversely associated with an establishable DSL data rate;

thereby allowing a sustainable increased data rate while reducing the quantity of errors detected over the period of time;

determining, by the processor, whether the performance data for the DSL loop has been retrieved and assessed for errors for a number of times less than a threshold number of times;

in response to determining that the performance data for the DSL loop has been retrieved and assessed for errors less than the threshold number of times, scheduling the DSL loop for performance data retrieval and error assessment at an interval of time of less than or equal to the period of time;

in response to determining that the performance data for the DSL loop has been retrieved and assessed for errors over the threshold number of times, determining whether the quantity of errors has been less than a second threshold quantity each time the errors have been assessed and determining whether the DSL data rate is less than a predetermined data rate value; and scheduling the DSL loop for performance data retrieval and error assessment at an interval of time greater than the period of time thereby scheduling performance data retrieval and error assessment on a less frequent basis in response to at least one of the following:

determining that the quantity of errors has not been less than a second threshold quantity each time the errors have been assessed; and determining that the DSL data rate is not less than the predetermined data rate value.

7. The method of claim 6, further comprising:

in response to determining that the quantity of errors has been less than the second threshold quantity each time the errors have been assessed and determining that the DSL data rate is less than the predetermined data rate value, determining whether the target noise margin is currently set at target value greater than a minimum target noise margin; and wherein adjusting the target noise margin comprises decreasing the target noise margin for the DSL loop in response to determining that target noise margin is currently set at a target value greater than the minimum target noise margin.

8. The method of claim 7, further comprising in response to decreasing the target noise margin for the DSL loop:

resetting the number of times the performance data for the DSL loop has been retrieved and assessed for errors to zero; and scheduling the DSL loop for performance data retrieval and error assessment at an interval of time of less than or equal to the period of time.

9. A computer-implemented method for adaptively applying a target noise margin to a digital subscriber line (DSL) loop to establish a DSL data rate on the DSL loop, the method comprising:

receiving, by a processor, performance data associated with a quantity of errors detected over a period of time on the DSL loop;

adjusting, by the processor, the target noise margin for the DSL loop based on the performance data in order to increase the DSL data rate and to reduce the quantity of errors detected over the period of time;

wherein the target noise margin is inversely associated with an establishable DSL data rate;

thereby allowing a sustainable increased data rate while reducing the quantity of errors detected over the period of time; and in response to determining that the quantity of errors do not exceed the threshold quantity for the period of time, scheduling the DSL loop for performance data retrieval and error assessment at an interval of time greater than the period of time thereby scheduling performance data retrieval and error assessment on a less frequent basis.

10. A computer program product comprising a tangible computer-readable medium having control logic stored therein for causing a computer to adaptively apply a target noise margin to a digital subscriber line (DSL) loop to establish a DSL data rate on the DSL loop, the control logic comprising computer-readable program code for causing the computer to:

receive performance data associated with a quantity of errors detected over a period of time on the DSL loop;

adjust the target noise margin for the DSL loop based on the performance data in order to increase the DSL data rate and to reduce the quantity of errors detected over the period of time wherein the target noise margin is inversely related to an establishable DSL data rate, thereby allowing a sustained increased data rate without an excessive quantity of errors;

determine whether the quantity of errors exceed a threshold quantity for the period of time wherein the computer-readable program code for causing the computer to adjust the target noise margin causes the computer to increase the target noise margin for the DSL loop in response to determining that the quantity of errors exceed the threshold quantity, wherein the DSL loop is experiencing errors due to impulse noise; and wherein the target noise margin impacts the effect of the impulse noise on the quantity of errors detected over the period of time on the DSL loop;

determine whether the performance data for the DSL loop has been retrieved and assessed for errors for a number of times less than a threshold number of times;

determine whether the quantity of errors exceed the threshold quantity for the period of time is operative to cause the computer to schedule the DSL loop for performance data retrieval and error assessment at an interval of time greater than the period of time therein scheduling performance data retrieval and error assessment on a less frequent basis in response to determining that the quantity of errors do not exceed the threshold quantity for the period of time.

11. A computer program product comprising a tangible computer-readable medium having control logic stored therein for causing a computer to adaptively apply a target noise margin to a digital subscriber line (DSL) loop to establish a DSL data rate on the DSL loop, the control logic comprising computer-readable program code for causing the computer to:

receive performance data associated with a quantity of errors detected over a period of time on the DSL loop;

adjust the target noise margin for the DSL loop based on the performance data in order to increase the DSL data rate and to reduce the quantity of errors detected over the period of time wherein the target noise margin is inversely related to an establishable DSL data rate, thereby allowing a sustained increased data rate without an excessive quantity of errors;

determine whether the quantity of errors exceed a threshold quantity for the period of time wherein the computer-readable program code for causing the computer to adjust the target noise margin causes the computer to increase the target noise margin for the DSL loop in response to determining that the quantity of errors exceed the threshold quantity, wherein the DSL loop is experiencing errors due to impulse noise; and wherein the target noise margin impacts the effect of the impulse noise on the quantity of errors detected over the period of time on the DSL loop;

determine whether the performance data for the DSL loop has been retrieved and assessed for errors for a number of times less than a threshold number of times;

in response to determining that the performance data for the DSL loop has been retrieved and assessed for errors less than the threshold number of times, schedule the DSL loop for performance data retrieval and error assessment at an interval of time equal to the period of time;

in response to determining that the performance data for the DSL loop has been retrieved and assessed for errors for the threshold number of times, determine whether the quantity of errors has been less than a second threshold quantity each time the errors have been assessed and determine whether the DSL data rate is less than a predetermined data rate value; and schedule the DSL loop for performance data retrieval and error assessment at an interval of time greater than the period of time therein scheduling performance data retrieval and error assessment on a less frequent basis in response to at least one of the following:

determining that the quantity of errors has not been less than a second threshold quantity each time the errors have been assessed; and determining that the DSL data rate is not less than the predetermined data rate value.

12. The computer program product of claim 11, further comprising computer-readable program code for causing the computer to:

determine whether the target noise margin is currently set at target value greater than a minimum target noise margin in response to determining that the quantity of errors has been less than the second threshold quantity each time the errors have been assessed and determining that the DSL data rate is less than the predetermined data rate value;

wherein the computer-readable program code for causing the computer to adjust the target noise margin causes the computer to decrease the target noise margin for the DSL loop in response to determining that target noise margin is currently set at a target value greater than the minimum target noise margin.

* * * * *

UNITED STATES PATENT AND TRADEMARK OFFICE
CERTIFICATE OF CORRECTION

PATENT NO.       : 7,570,599 B2                                             Page 1 of 1
APPLICATION NO. : 11/104768
DATED            : August 4, 2009
INVENTOR(S)      : Gary Tennyson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Seventh Day of September, 2010

David J. Kappos
*Director of the United States Patent and Trademark Office*